(12) United States Patent
Hwang et al.

(10) Patent No.: US 7,844,050 B2
(45) Date of Patent: Nov. 30, 2010

(54) BIAXIAL HINGE DEVICE FOR MOBILE TERMINAL AND MOUNTING MECHANISM THEREOF

(75) Inventors: Sung-Jun Hwang, Gumi-si (KR); Jong-Gun Bae, Gumi-si (KR)

(73) Assignee: Samsung Electronics Co., Ltd., Suwon-si, Gyeonngi-do (KR)

( * ) Notice: Subject to any disclaimer, the term of this patent is extended or adjusted under 35 U.S.C. 154(b) by 1289 days.

(21) Appl. No.: 11/202,109

(22) Filed: Aug. 12, 2005

(65) Prior Publication Data

US 2006/0042044 A1 Mar. 2, 2006

(30) Foreign Application Priority Data

Aug. 28, 2004 (KR) .................. 10-2004-0068217

(51) Int. Cl.
*H04M 1/00* (2006.01)
*H04M 9/00* (2006.01)
(52) U.S. Cl. ................. 379/433.13; 455/575.3
(58) Field of Classification Search ............ 379/433.01, 379/433.11, 433.13; 455/90.3, 575.1, 575.3; 16/367, 319, 330, 303, 329, 331, 304, 366, 16/340, 317
See application file for complete search history.

(56) References Cited

U.S. PATENT DOCUMENTS 6,839,576 B2 * 1/2005 Aagaard et al. .......... 455/575.1
7,034,755 B2 * 4/2006 Takagi .................... 343/702
7,266,864 B2 * 9/2007 Kim ........................ 16/367
7,299,526 B2 * 11/2007 Kim ........................ 16/367
2003/0040288 A1 2/2003 Kang
2004/0141287 A1 7/2004 Kim
2007/0123319 A1 * 5/2007 Hwang ................ 455/575.1

FOREIGN PATENT DOCUMENTS

| CN | 1414767 | | 4/2003 |
| CN | 1517507 | | 8/2004 |
| EP | 1 288 414 | | 8/2003 |
| EP | 1 467 538 | | 10/2004 |
| EP | 1791330 | A1 * | 5/2007 |
| JP | 2003-110673 | | 9/2001 |
| JP | 2003-110673 | | 8/2003 |
| WO | WO 2004/036069 | | 4/2004 |

* cited by examiner

*Primary Examiner*—Fan Tsang
*Assistant Examiner*—Phylesha Dabney
(74) *Attorney, Agent, or Firm*—Roylance, Abrams, Berdo & Goodman, L.L.P.

(57) ABSTRACT

A biaxial hinge device and a mounting mechanism thereof for a mobile terminal is provided. The biaxial hinge device includes a first hinge module for rotatably connecting the folder to the body around a first hinge axis, and a second hinge module for rotatably connecting the folder to the body around a second hinge axis, which is spaced apart form the first hinge axis and disposed in a direction substantially perpendicular to the first hinge axis. A portion of a second hinge module is inserted in the first hinge module, thereby allowing the second hinge module to move both independently of and in cooperation with the first hinge module.

20 Claims, 10 Drawing Sheets

BIAXIAL HINGE DEVICE FOR MOBILE TERMINAL AND MOUNTING MECHANISM THEREOF

CROSS REFERENCE TO RELATED APPLICATION

This application claims the benefit under 35 U.S.C. §119 (a) of an application entitled "Biaxial Hinge Device for Mobile Terminal and Mounting Mechanism Thereof" filed in the Korean Industrial Property Office on Aug. 28, 2004 and assigned Serial No. 2004-68217, the entire contents of which are hereby incorporated by reference.

BACKGROUND OF THE INVENTION

1. Field of the Invention

The present invention relates to digital communication apparatuses, such as cellular phones, PDAs (personal digital assistants), HHPs (hand held phones), camera phones, game phones, Internet phones, and the like. More particularly, the present invention relates to a biaxial hinge device for a mobile terminal and a mounting mechanism thereof.

2. Description of the Related Art

In general, mobile terminals are electronic devices capable of being carried by a user for wireless communication. A mobile terminal tends to be more compact, thin, and lightweight, to facilitate terminal portability. In addition, the terminal incorporates multimedia technologies providing a large variety of functions. In particular, a future mobile terminal may be compact, lightweight, multifunctional, and multipurpose, and be developed to adapt itself to various multimedia or internet environments. Furthermore, the mobile terminal is an electronic device commonly used by consumers all over the world, and has become an essential part of everyday life.

There are several types of appearances for mobile terminals, such as a bar-type mobile terminal, a flip-type mobile terminal, and a folder-type mobile terminal. There also are two types of mobile terminals according to a carrying position or carrying fashion, including a necklace-type mobile terminal, and a wrist-type mobile terminal. In addition, there are three types of mobile terminals according to an operation manner of a folder, including a swing-type mobile terminal, a sliding-type mobile terminal, and a swivel-type mobile terminal. The above described mobile terminals are known by those skilled in the art.

A conventional mobile terminal has been adapted to carry out high-speed data communications, as well as voice communications. As consumer demands have increased, various services capable of using wireless communication technology for transmitting and receiving data at a high speed are provided.

In addition, a conventional mobile terminal has been developed to transmit an image signal using a camera lens mounted to the portable terminal. Specifically, the portable terminal is provided with an embedded or external camera lens module, so that a user can communicate an image to another terminal or to photograph a desired object.

However, since the conventional flip-type mobile terminal or folder-type mobile terminal adopts a construction of two housings rotatably connected to each other by one hinge device, it is inconvenient for a user to see information displayed on a display device of the mobile terminal.

Accordingly, a need exists for an improved biaxial hinge device for a mobile terminal and a mounting mechanism thereof that allows a user to conveniently see information displayed on a display device and to conveniently manipulate input keys.

SUMMARY OF THE INVENTION

Accordingly, an object of the present invention is to provide a biaxial hinge device for a mobile terminal and a mounting mechanism thereof.

Another object of the present invention is to provide a biaxial hinge device for a mobile terminal and a mounting mechanism thereof, in which a folder may be folded and unfolded in two different directions by means of first and second hinge axes to improve convenient use by a user.

Still another object of the present invention is to provide a biaxial hinge device for a mobile terminal and a mounting mechanism thereof, in which a user may conveniently see information displayed on a display device and conveniently manipulate input keys.

A biaxial hinge device for a mobile terminal includes a body and a folder folded on or unfolded from the body. The biaxial hinge device includes a first hinge module for rotatably connecting the folder to the body around a first hinge axis, and a second hinge module for rotatably connecting the folder to the body around a second hinge axis that is spaced apart form the first hinge axis and disposed in a direction substantially perpendicular to the first hinge axis. A portion of the second hinge module is inserted in the first hinge module, thereby allowing the second hinge module to move both independently of and in cooperation with the first hinge module.

According to another aspect of the present invention, a biaxial hinge device for a mobile terminal includes a body and a folder folded on or unfolded from the body. The biaxial hinge device includes an auxiliary center shaft for rotatably connecting the folder to the body around a first hinge axis. An outer periphery of the auxiliary center shaft is formed with a first receiving groove. A second main center shaft rotatably connects the folder to the body around a second hinge axis that is spaced apart form the first hinge axis and disposed in a direction substantially perpendicular to the first hinge axis. An outer periphery of the second main center shaft is formed with a second receiving groove, and the second main center shaft receives a portion of the auxiliary center shaft in cooperation with each other.

According to another aspect of the present invention, a mounting mechanism of a biaxial hinge device for a mobile terminal includes a side arm provided to a body, and a biaxial hinge module having a first hinge axis and a second hinge axis spaced apart form the first hinge axis and disposed in a direction substantially perpendicular to the first hinge axis. A side hinge housing accommodating the biaxial hinge module and restricting movement of the side arm rotates around the first hinge axis. First fastening means restricts the biaxial hinge module to the side arm. Second fastening means restricts the biaxial hinge module to the side hinge housing.

Other objects, advantages and salient features of the invention will become apparent from the following detailed description, which, taken in conjunction with the annexed drawings, discloses exemplary embodiments of the invention.

BRIEF DESCRIPTION OF THE DRAWINGS

The above and other objects, features and advantages of the present invention will be more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

Figure 1:
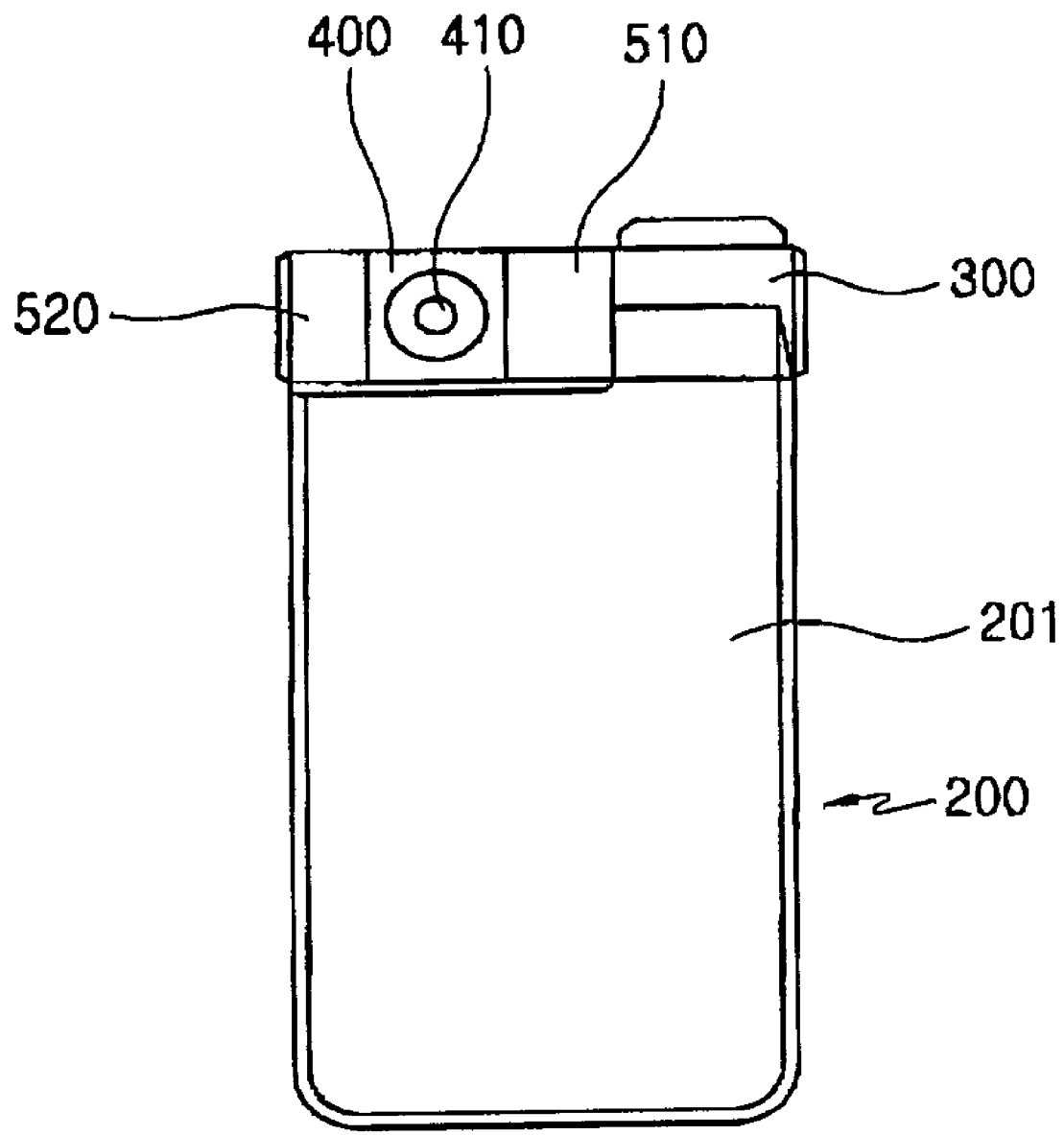
FIG. 1 is a front view of a mobile terminal employing a biaxial hinge device according to an exemplary embodiment of the present invention.

Hereinafter, exemplary embodiments of the present invention are described with reference to the accompanying drawings.

As shown in FIGS. 1 through 4, a mobile terminal employing a biaxial hinge device according to an exemplary embodiment of the present invention will be described, prior to description of the biaxial hinge device and a mounting mechanism according to an exemplary embodiment of the present invention.

The mobile terminal includes a body and a folder foldable around a first hinge shaft in a transverse direction or a second hinge shaft in a vertical direction, so that a user may selectively use a folding position of the folder to input data or view the data displayed on a screen.

As shown in FIGS. 1 through 4, the mobile terminal employing the biaxial hinge device includes a body 100, a first hinge axis A1 transversely disposed in the body 100, a second hinge axis A2 vertically disposed in the body 100, and a folder 200 selectively rotating around the first and second hinge axes A1 and A2. Specifically, the folder 200 is connected to the body 100 to rotate around the first hinge axis A1 so that the folder moves close to or far apart from the body, with the folder being opposite to the body. Also, the folder 200 is connected to the body 100 to rotate around the second hinge axis A2 so that the folder moves close to or far apart from the body, with the folder being opposite to the body.

Preferably, the body 100 has a plate box shape with a rectangular upper surface 101 and a rectangular lower surface (not shown), and a shape of the folder 200 preferably corresponds to the shape of the body 100. The body 100 shown in FIG. 1 preferably extends in a vertical direction rather than a transverse direction. At this time, the first hinge axis A1 extends along an upper end of the body 100, while the second hinge axis A2 extends along one side of the body 100. Preferably, the first and second hinge axes A1 and A2, are vertically spaced apart from each other.

The body 100 includes a pair of side arms 510 and 520 integrally formed on the upper surface 101 towards the upper end of the body. A rotatable lens housing 400 is disposed between the pair of the side arms 510 and 520, with a camera lens 410 thereof being exposed. A biaxial hinge device (housed within the side hinge housing 300 shown) is rotatably mounted adjacent to the side arm 510. A keypad 110 having a plurality of input keys is disposed on the upper surface 101 of the body. A slot 114 is linearly elongated along an edge 103 of the upper surface 101. The slot 114 prevents interference by the rotation of the folder 200. The side hinge housing 300 is provided with a biaxial hinge device as described hereinafter.

The folder 200 has a flat upper surface 201 and a lower surface 202. A loudspeaker 210 and a display 212 adjacent to the loudspeaker 210 are disposed on the lower surface 202.

Figure 4:
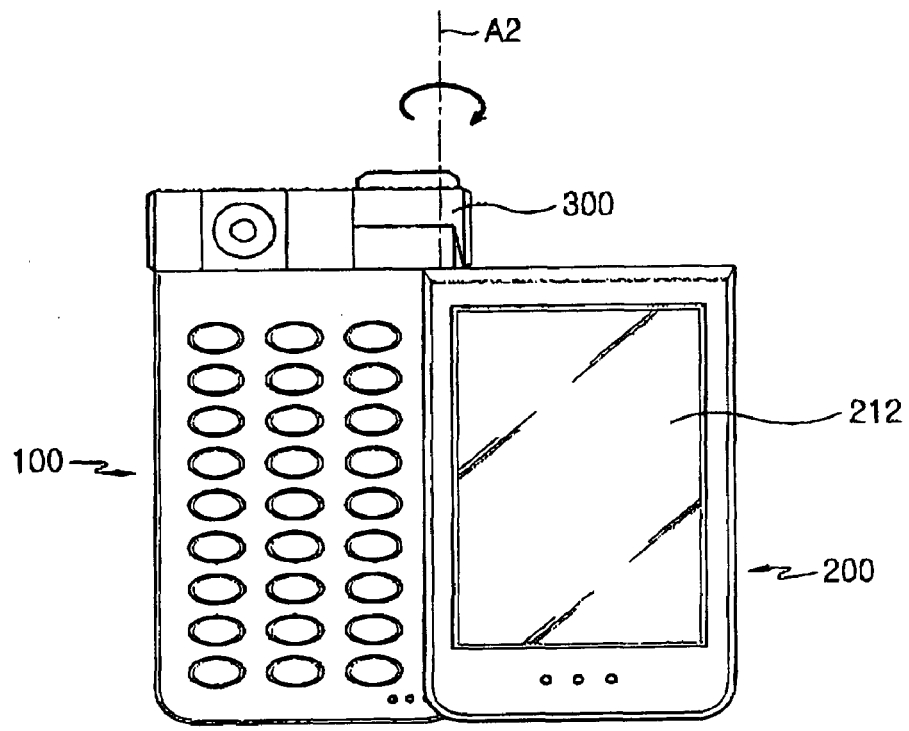
FIG. 4 is a front view of a folder of the mobile terminal of FIG. 1 rotated around a second hinge axis to a fully opened position.

The mobile terminal may be utilized in the state shown in FIG. 1 or the state shown in FIG. 4, depending upon selection of the user. FIG. 1. shows a calling mode, while FIG. 4 shows a seeing and hearing mode for PDA, TV or video.

Figure 2:
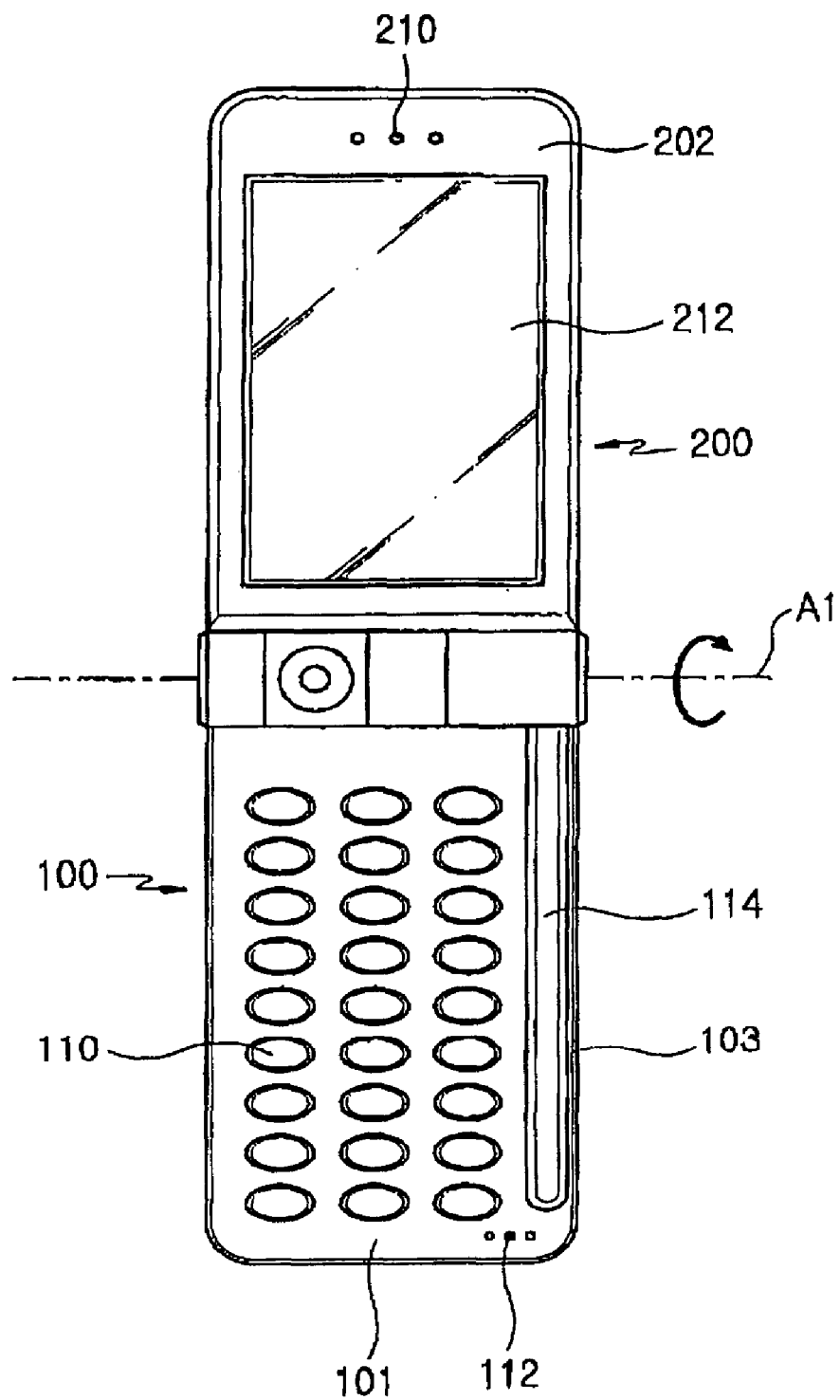
FIG. 2 is a front view of a folder of the mobile terminal of FIG. 1 rotated around a first hinge axis to an opened position.
Figure 3:
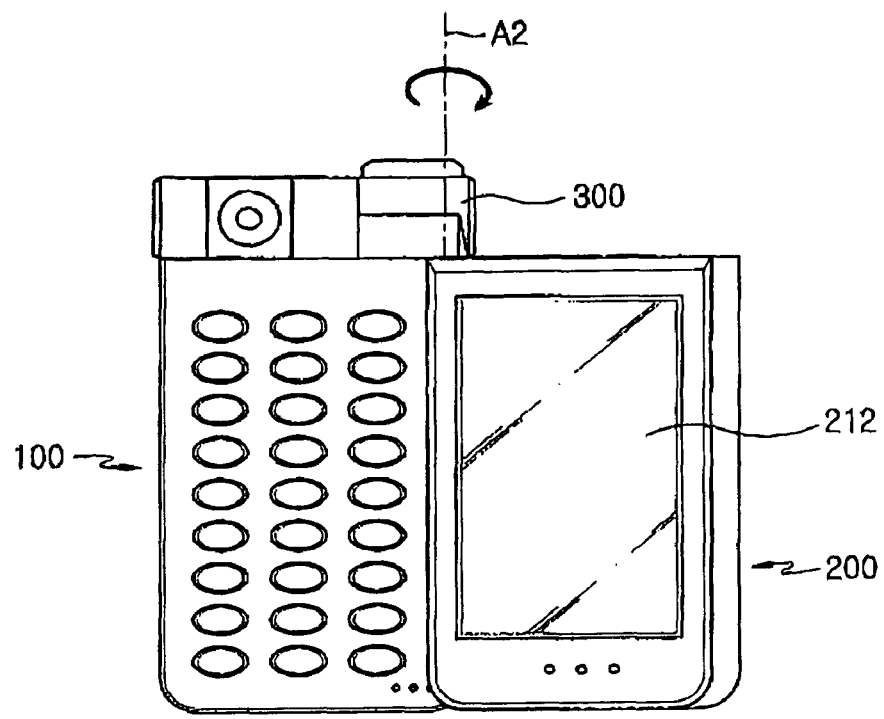
FIG. 3 is a front view of a folder of the mobile terminal of FIG. 1 rotated around a second hinge axis to about 150°.

A rotating angle of the folder 200 around the first hinge axis A1 is preferably within a range from about 130° to about 160°, and FIG. 2 shows a fully opened state of the folder 200. A rotating angle of the folder 200 around the second hinge axis A2 is preferably about 180°, and FIG. 4 shows a fully opened state of the folder 200.

Figure 5:
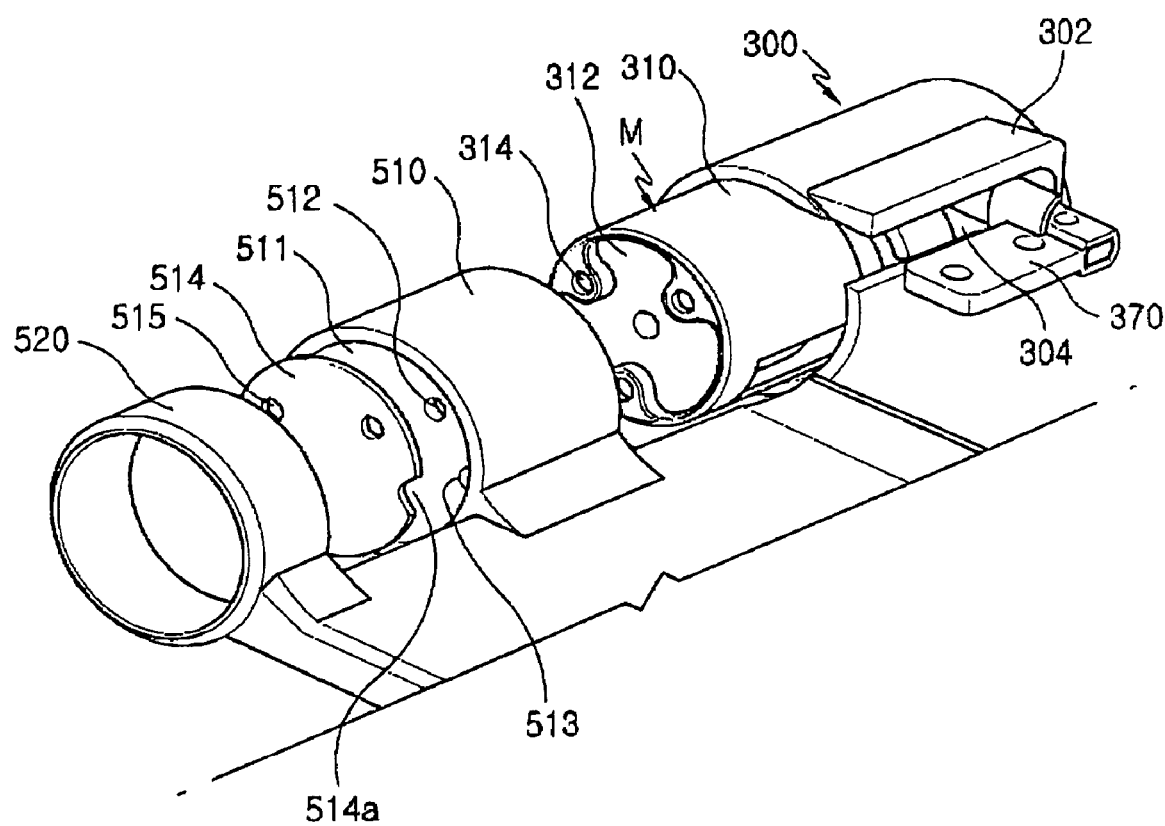
FIG. 5 is an exploded perspective view of a mounting mechanism for fixing a biaxial hinge device according to an exemplary embodiment of the present invention when it is seen from a left side.
Figure 6:
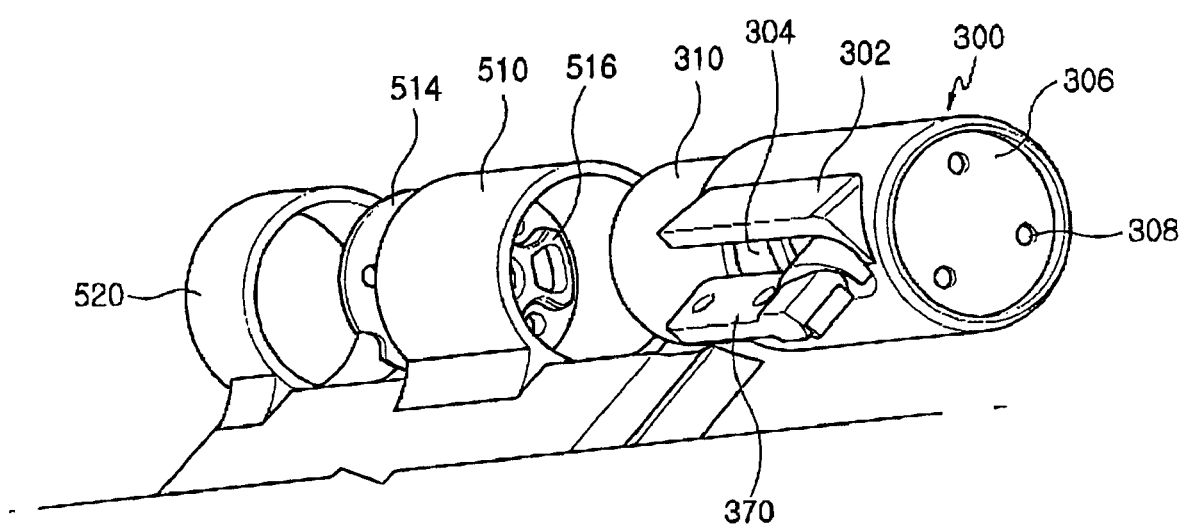
FIG. 6 is an exploded perspective view of a mounting mechanism for fixing a biaxial hinge device according to an exemplary embodiment of the present invention when it is seen from a right side.

A mounting mechanism of the biaxial hinge device M will now be described with reference to FIGS. 5 and 6, prior to a detailed description of the biaxial hinge device M according to an exemplary embodiment of the present invention. As shown in FIGS. 5 and 6, the mounting mechanism according to an exemplary embodiment of the present invention includes the side arm 510 disposed at a desired position of the body for mounting the biaxial hinge device M, which provides the first and second hinge axes and rotates around the first hinge axis A1, to the side arm 510 of the body, the side hinge housing 300 accommodating the biaxial hinge device M and restricting movement of the side arm 510 rotating around the first hinge axis, and fastening means for fixing the side hinge housing 300 to the side arm 510. The fastening means includes first fastening means provided at one side of the side arm 510, and second fastening means provided to the other side of the side hinge housing 300.

The first fastening means has a first fastening member 514 inserted and fixed to a first recess 511 formed on an outer surface of the side arm 510 by means of a screw (not shown), a first fastening boss 516 formed on an inner surface of the side arm 510, a first fastening groove 312 formed on an outer surface of the main hinge housing 310 of the biaxial hinge device for accommodating the first fastening boss 516, and first fastening holes 314, 512 and 515 for restraining the first fastening member 514, the side arm 510, and the main hinge housing 310 by fastening fastener, such as a screw (not shown), thereto in the axial direction of the first hinge axis. The first fastening holes 314, 512 and 515 are coaxially formed on the surface of the main hinge housing 310, respectively.

The first fastening member 514 is preferably a plate element, and is formed with a first engaging groove 514a of a desired shape on the outer surface of the first fastening member. The first recess 511 is formed with a first engaging boss 513 corresponding to the first engaging groove 514a on an inner wall of the first recess 511. The first engaging groove 514a is recessed in a center direction of the first fastening member 514, and the first engaging boss 513 protrudes in a center direction of the first recess 511. The first fastening member 514 is fixed in the axial direction of the first hinge axis by fastening a screw (not shown) to the fastening hole 515 and coupling the first engaging boss 513 with the first engaging groove 514a.

The first fastening boss 516 protrudes from the inner surface of the side arm 510, and is formed in a shape of three-leafed clover. In addition, the first fastening groove 312 has a shape corresponding to the first fastening boss 516. By inserting the first fastening boss 516 in the first fastening groove 312, the main hinge housing 310 of the biaxial hinge device is stably fixed to the side arm 510.

Figure 7:
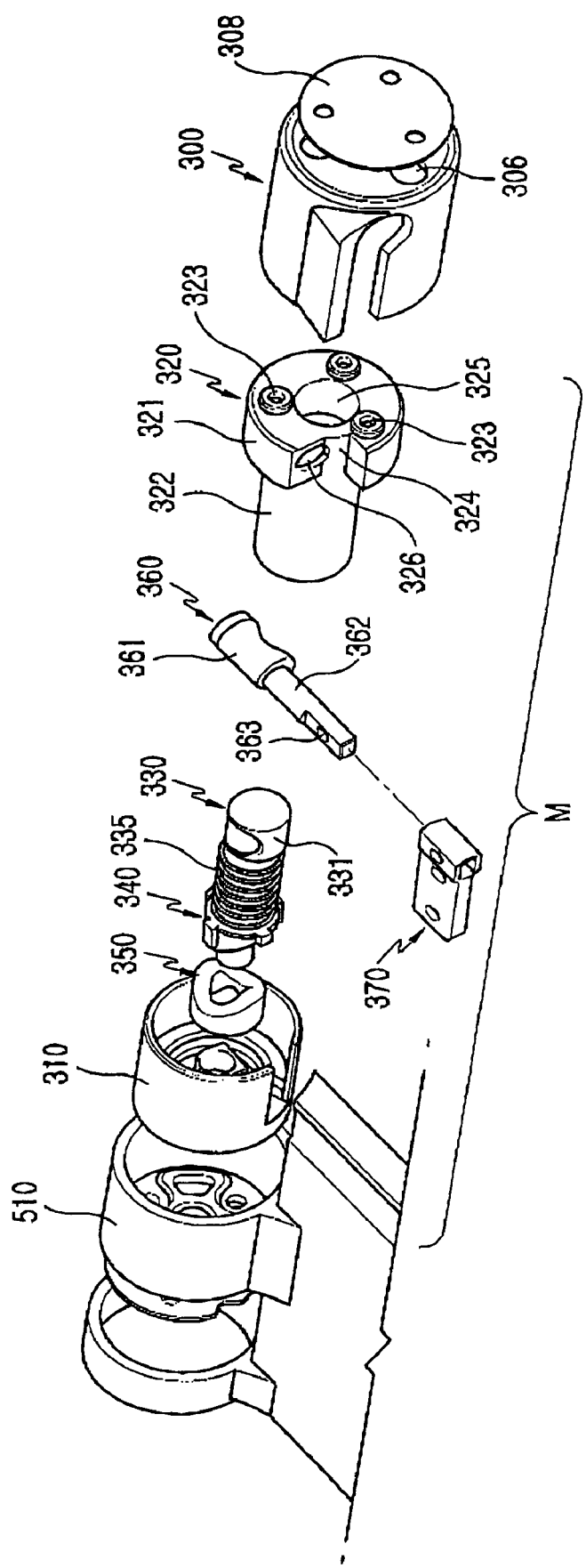
FIG. 7 is an exploded perspective view of a biaxial hinge device according to an exemplary embodiment of the present invention when it is seen from a right side.
Figure 8:
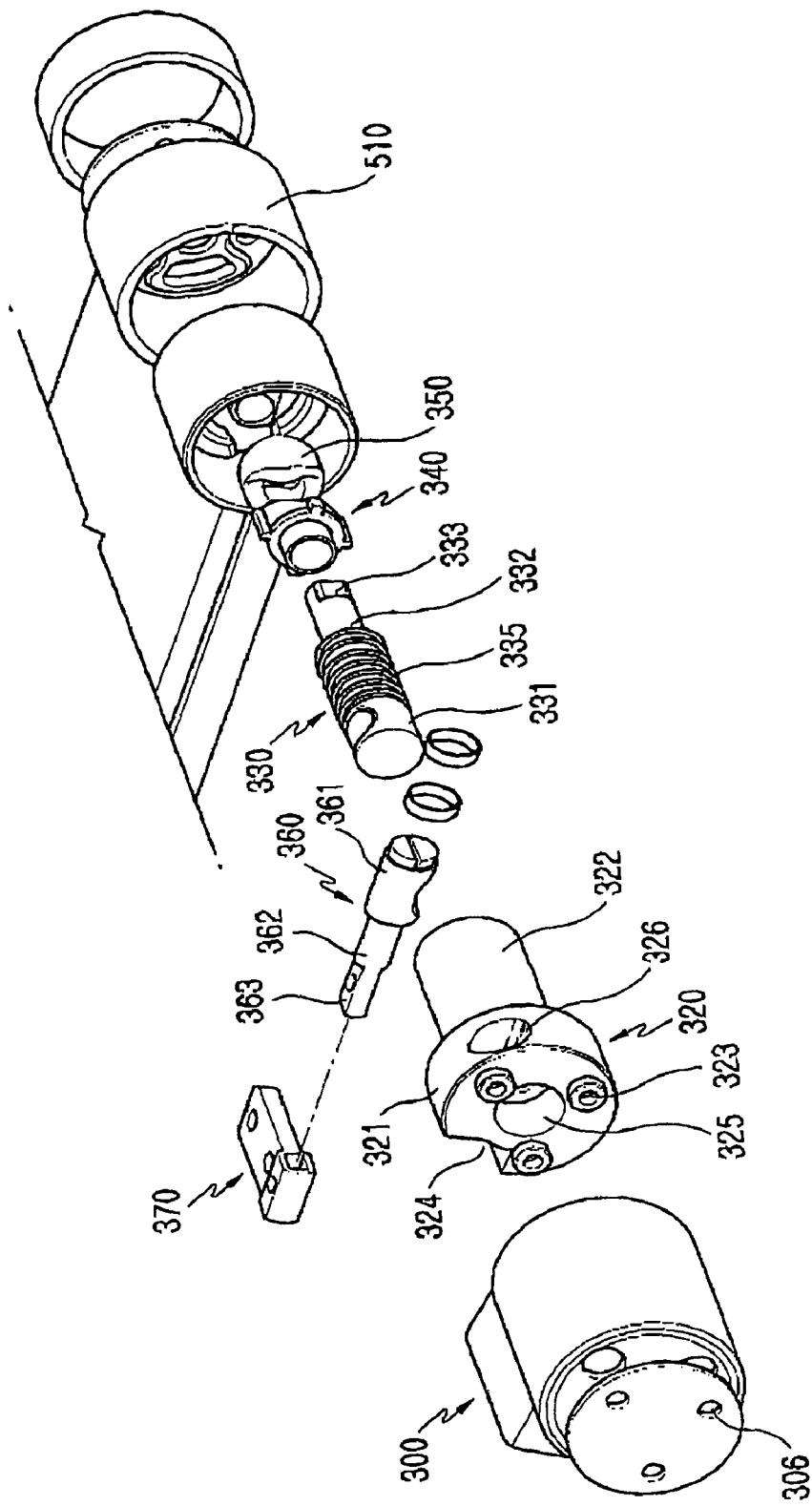
FIG. 8 is an exploded perspective view of a biaxial hinge device according to an exemplary embodiment of the present invention when it is seen from a left side.

As shown in FIGS. 7 and 8, the second fastening means fixes the biaxial hinge device M to the side hinge housing 300 in the axial direction of the first hinge axis. Specifically, the second fastening means includes second fixing bosses 323 formed at the other end of the main hinge shaft 320 of the biaxial hinge device, fixing holes 306 formed on the other end surface of the side hinge housing 300 for receiving the fixing bosses 323, and a second fastening member 308 fastened with the main hinge shaft 320 at the other side of the side hinge arm by means of a screw (now shown). The second fastening member 308 is preferably a plate.

The construction of the side hinge housing 300 will now be described in detail with reference to FIGS. 5 and 6. The side hinge housing 300 is formed with an assembling opening 304 of a desired shape for accommodating a second hinge module (360 and 370 in FIG. 7) of the biaxial hinge device M. FIGS. 5 and 6 show an exposed state of a fastening piece 370 of the biaxial hinge device assembled to the side hinge housing 300. In addition, a structural reinforcing portion 302 is provided around the assembling opening 304 of the side hinge housing to prevent the side hinge housing from being cracked by rotation of the second hinge module of the biaxial hinge device.

The construction of the biaxial hinge device M according to the present invention will now be described with reference to FIGS. 7 and 8. As shown in FIGS. 7 and 8, the biaxial hinge device M according to an exemplary embodiment of the present invention is accommodated in the side hinge housing 300, and includes a first hinge module providing the first hinge axis and a second hinge module providing the second hinge axis. The first and second hinge modules are vertically disposed to operate in cooperation with each other, the description of which will be given hereinafter.

Specifically, the first hinge module includes a main hinge housing 310 fastened to the side arm 510, a first main center shaft 320 fastened to the side hinge housing 300 in which rotation of the first main center shaft is restricted by the main hinge housing 310, an auxiliary center shaft 330 accommodated in the first main center shaft 320, and hinge members sequentially inserted into the auxiliary center shaft 330 for providing opening and closing forces in cooperation with these hinge members (that is, hinge spring 335, a hinge shaft 340 and a hinge cam 350).

The first main center shaft 320 has a large diameter portion 321, and a small diameter portion 322 extending from the large diameter portion 321. The large diameter portion 321 is provided with a plurality of fastening bosses 323 so that it is restricted by the side hinge housing 300, and also with a cutaway portion 324 of a desired shape for accommodating the second main center shaft 360 of the second hinge module.

In addition, the first main center shaft 320 is formed with a first opening 325 perforating a center portion thereof for accommodating the auxiliary center shaft 330. In addition, the large diameter portion 321 is formed with a second opening 326 for accommodating the second main center shaft 360 of the second hinge module. The first opening 325 is continuously elongated in the axial direction of the first hinge axis, and the second opening 326 is continuously elongated in the axial direction of the second hinge axis. Specifically, the first opening 325 perforates a rotational center axis of the first main center shaft 320, and the second opening 326 is spaced apart from the first opening in a direction substantially perpendicular to the elongated direction of the first opening 325. Preferably, the first and second openings 325 and 326 are in communication with each other.

Figure 9:
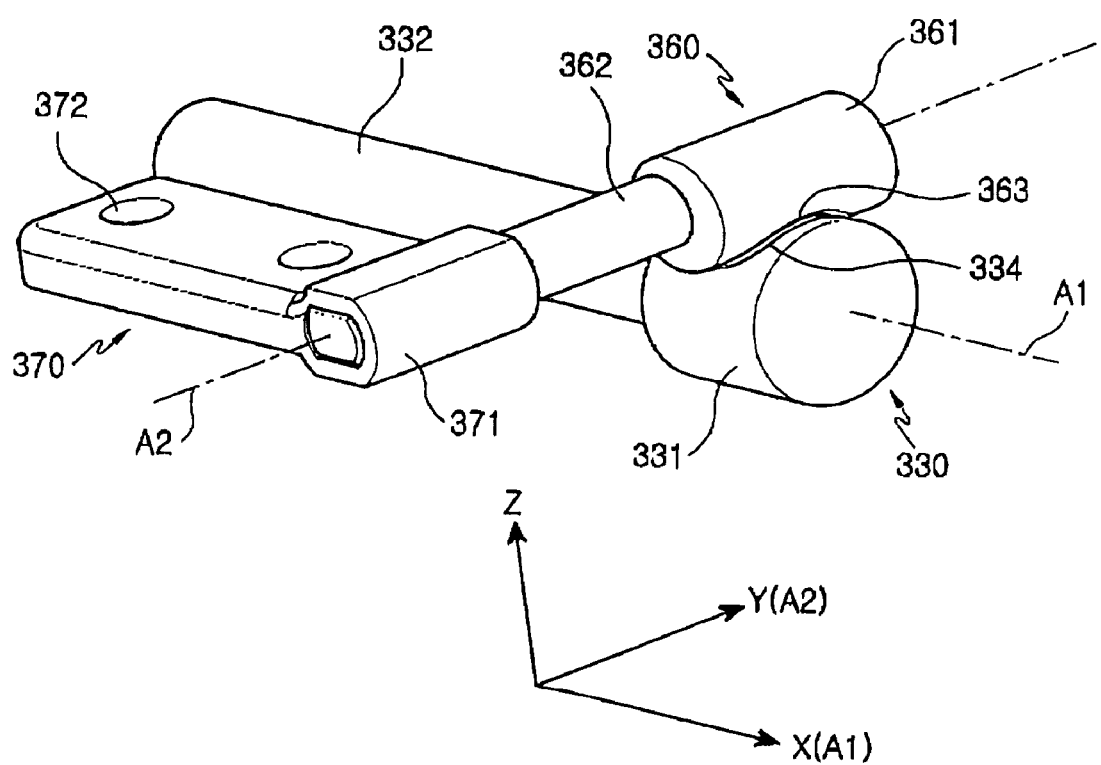
FIG. 9 is a perspective view of a cooperating relation between first and second main center shafts of a biaxial hinge device according to an exemplary embodiment of the present invention.

As shown in FIG. 9, the auxiliary center shaft 330 has a large diameter portion 331, and a small diameter portion 332 extending from a center of the large diameter portion 331. The hinge spring 335, the hinge shaft 340, and the hinge cam 350 are sequentially inserted in the small diameter portion 332. The construction and operation of the hinge spring 335, hinge shaft 340 and hinge cam 350 are widely known in the art, the detailed description of which is omitted herein.

The second hinge module has a second main center shaft 360, and a fastening piece 370 fastened to a stepped portion of the second main center shaft 360. The second main center shaft 360 has a cam portion 361 inserted in the second opening 326 for camming the large diameter portion 331 of the auxiliary center shaft, and a fastening shaft 362 extending from the cam portion 361 and fastened to the fastening piece by means of a fastener, such as a screw. The fastening shaft 362 is provided at an end portion thereof with a D-shaped cut portion 363 to engage the fastening piece 370.

The cooperation between the auxiliary center shaft 330 and the second main center shaft 360 will now be described in detail with reference to FIGS. 9 through 11. As previously described, the auxiliary center shaft 330 has the large diameter portion 331 perforating the first hinge shaft, and the small diameter portion 332 extending from one side of the large diameter portion 331, as shown in FIG. 9. Since the large diameter portion 331 and the small diameter portion 332 have a circular cross section, a stepped portion is provided therebetween. The small diameter portion 332 linearly extends and has the D-shaped cut portion 333 at the one end portion thereof (FIG. 8). The large diameter portion 331 is formed with a first receiving groove 334 at an outer periphery thereof. The first receiving groove 334 receives a portion of the outer periphery of the cam portion 361 of the second main center shaft 360 according to the rotation of the second main center shaft. The first receiving groove 334 has a convex round surface corresponding to the outer periphery of the cam portion 361.

As described already, the second main center shaft 360 has the cam portion 361 disposed along the second hinge axis, and the fastening piece 370 formed at the stepped portion of the second main center shaft 360 and secured to the folder by means of a fastener, such as a screw. The second main center shaft 360 and the fastening piece 370 are vertically opposite to each other. Preferably, the fastening piece 370 is a plate. The fastening piece 370 extends from the second main center shaft 360 substantially parallel to the small diameter portion 332 of the auxiliary center shaft 330 along the first hinge axis.

The second main center shaft 360 has a cam portion 361 slidingly contacting the auxiliary center shaft 330, and a fastening shaft 362 linearly extending from one side of the cam portion 361. Preferably, the cam portion 361 is formed with a second receiving groove 363 of a desired shape at the outer periphery thereof. The second receiving groove 363 receives a portion of the outer periphery of the large diameter portion 331. The second receiving groove 363 has a round bottom corresponding to the outer periphery of large diameter portion 331. The fastening shaft 362 is coupled to the stepped portion 371 of the fastening piece 370. The fastening piece 370 is formed with a plurality of fastening holes 372, and is fastened to the folder by means of a fastener, such as a screw (not shown).

Preferably, the cam portion 361 and the fastening shaft 362 are linearly and cylindrically extending. A diametric center of the cam portion is preferably offset from a diametric center of the fastening shaft. In other words, the diametric center of the cam portion 361 does not coincide with that of the fastening shaft 362. The auxiliary center shaft 330 and the second main center shaft 360 shown in FIG. 9 correspond to the state shown in FIG. 1. The auxiliary center shaft 330 and the second main center shaft 360 shown in FIG. 10 correspond to the state shown in FIG. 3. The auxiliary center shaft 330 and the second main center shaft 360 shown in FIG. 11 correspond to the state shown in FIG. 2.

Figure 10:
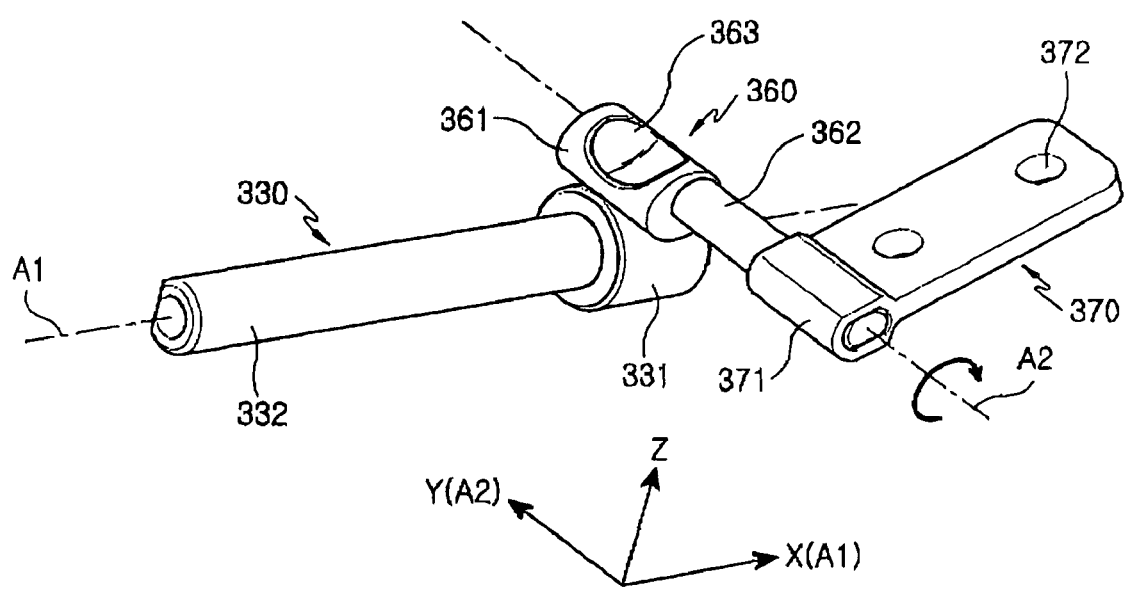
FIG. 10 is a perspective view of the second main center shaft of FIG. 9 rotated around a second hinge axis to about 150°.
Figure 11:
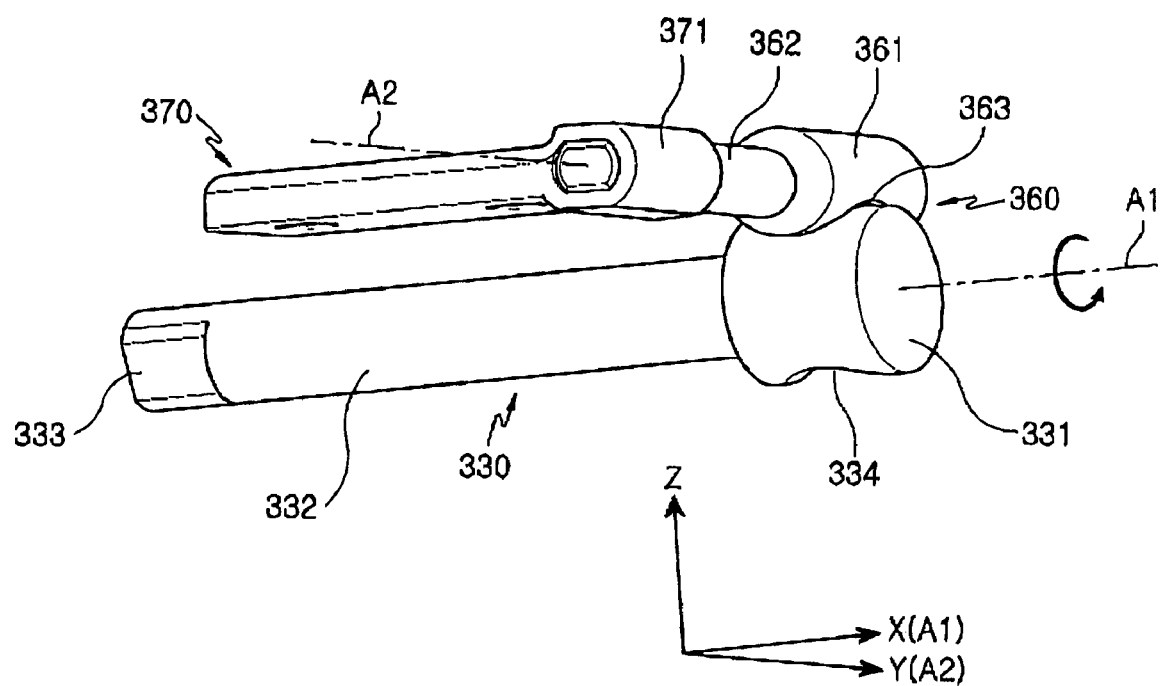
FIG. 11 is a perspective view of the second main center shaft of FIG. 9 rotated around a first hinge axis to about 150°.

When the second main center shaft 360 is rotated around the second hinge axis A2 to about 160°, the state shown in FIG. 9 changes into the state shown in FIG. 10. Additionally, when the second main center shaft 360 is rotated around the first hinge axis A1 to about 180°, the state shown in FIG. 9 changes into the state shown in FIG. 11.

With the above description, the exemplary embodiment of the present invention opens the folder in two directions so that the user may conveniently see the information or input the data in relation to the conventional device.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A biaxial hinge device for a mobile terminal including a body and a folder folded on or unfolded from the body, the biaxial hinge device comprising:
    a first hinge module for rotatably connecting the folder to the body around a first hinge axis; and
    a second hinge module for rotatably connecting the folder to the body around a second hinge axis that is spaced apart from the first hinge axis and disposed in a direction substantially perpendicular to the first hinge axis, a portion of the second hinge module being inserted in the first hinge module, and the second hinge module slides in the first hinge module in cooperation with each other.

2. The biaxial hinge device as claimed in claim 1, wherein the first hinge module includes
    a main hinge housing fastened to the body;
    a first main center shaft inserted in the main hinge housing in an axial direction of the first hinge axis;
    an auxiliary center shaft inserted in the first main center shaft; and
    hinge members sequentially inserted around the first hinge axis onto the auxiliary center shaft for providing opening and closing forces.

3. The biaxial hinge device as claimed in claim 2, wherein the first main center shaft includes
    a large diameter portion having a cutaway portion circumferentially formed on an outer periphery of the first main center shaft at a desired angle, a first opening elongated along the first hinge axis, and a second opening vertically elongated from the first opening at the cutaway portion; and
    a small diameter portion coaxially extending from the large diameter portion.

4. The biaxial hinge device as claimed in claim 3, wherein the first and second openings are in communication with each other.

5. The biaxial hinge device as claimed in claim 2, wherein the auxiliary center shaft includes
    a large diameter portion; and
    a small diameter portion linearly and coaxially extending from the large diameter portion for receiving the hinge members, and having a substantially D-shaped cut-out portion proximal one end thereof.

6. The biaxial hinge device as claimed in claim 5, wherein the large diameter of the auxiliary center shaft is formed with a first receiving groove on an outer periphery thereof.

7. The biaxial hinge device as claimed in claim 2, wherein the hinge members include
    a hinge cam received in the main hinge housing;
    a hinge shaft disposed opposite to the hinge cam and performing camming operations; and
    a hinge spring closely contacting the hinge cam and the hinge shaft.

8. The biaxial hinge device as claimed in claim 1, wherein the second hinge module includes
    a second main center shaft accommodated in the first hinge module; and
    a fastening piece fastened to an end portion of the second main center shaft.

9. The biaxial hinge device as claimed in claim 8, wherein the second main center shaft includes
    a cam portion slidingly contacting the first hinge module; and
    a fastening shaft linearly and integrally extending from one side of the cam portion.

10. The biaxial hinge device as claimed in claim 9, wherein the cam portion is formed with a second receiving groove on an outer periphery thereof.

11. The biaxial hinge device as claimed in claim 9, wherein a diametric center of the cam portion is offset from a diametric center of the fastening shaft such that the diametric centers of the cam portion and the fastening shaft are not axially aligned.

12. The biaxial hinge device as claimed in claim 8, wherein the fastening piece is connected to the folder.

13. A biaxial hinge device for a mobile terminal including a body and a folder folded on or unfolded from the body, the biaxial hinge device comprising:
    an auxiliary center shaft for rotatably connecting the folder to the body around a first hinge axis, an outer periphery of the auxiliary center shaft being formed with a first receiving groove; and
    a second main center shaft for rotatably connecting the folder to the body around a second hinge axis that is spaced apart from the first hinge axis and disposed in a direction substantially perpendicular to the first hinge axis, an outer periphery of the second main center shaft being formed with a second receiving groove, and the second main center shaft receives a portion of the auxiliary center shaft in cooperation with each other.

14. The biaxial hinge device as claimed in claim 13, wherein
    the first receiving groove accommodates a desired region of the outer periphery of the second main center shaft, and the second receiving groove accommodates a desired region of the outer periphery of the auxiliary center shaft according to rotation of the shafts.

15. The biaxial hinge device as claimed in claim 13, wherein
the first and second receiving grooves are formed with a round bottom surface.

16. A mounting mechanism of a biaxial hinge device for a mobile terminal, the mounting mechanism comprising:
a side arm connected to a body;
a biaxial hinge module having a first hinge axis and a second hinge axis spaced from the first hinge axis and disposed in a direction substantially perpendicular to the first hinge axis;
a side hinge housing accommodating the biaxial hinge module and restricting movement of the side arm rotating around the first hinge axis;
first fastening means for securing the biaxial hinge module to the side arm; and
second fastening means for securing the biaxial hinge module to the side hinge housing.

17. The mounting mechanism as claimed in claim 16, wherein
the side hinge housing is formed with an assembling opening.

18. The mounting mechanism as claimed in claim 17, wherein
a structural reinforcing portion is provided around the assembling opening.

19. The mounting mechanism as claimed in claim 16, wherein the first fastening means includes
a first recess formed on an outer surface of the side arm;
a first fastening member fastened to the first recess in an axial direction of the first hinge axis by a fastener;
a first fastening boss formed on an inner surface of the side arm; and
a first fastening groove formed on an outer surface of the biaxial hinge device for connecting to the first fastening boss.

20. The mounting mechanism as claimed in claim 19, wherein
the first fastening member is a plate.

* * * * *